United States Patent
Shim et al.

(10) Patent No.: US 7,384,363 B2
(45) Date of Patent: Jun. 10, 2008

(54) SIX-SPEED POWERTRAIN OF AUTOMATIC TRANSMISSION

(75) Inventors: Hyu Tae Shim, Hwaseong (KR); Ki Been Lim, Yongin (KR); Gyung Cheol Lee, Gunpo (KR); Byeong Ho Soh, Hwaseong (KR); Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 301 days.

(21) Appl. No.: 11/305,689

(22) Filed: Dec. 15, 2005

(65) Prior Publication Data

US 2006/0135310 A1   Jun. 22, 2006

(30) Foreign Application Priority Data

Dec. 22, 2004   (KR) .................. 10-2004-0110553

(51) Int. Cl.
    *F16H 3/62*   (2006.01)
(52) U.S. Cl. ...................... 475/275; 475/283
(58) Field of Classification Search ............... 475/275, 475/283
See application file for complete search history.

(56) References Cited

U.S. PATENT DOCUMENTS

| | | | |
|---|---|---|---|
| 7,137,923 B2* | 11/2006 | Tiesler et al. | 475/276 |
| 2005/0090363 A1* | 4/2005 | Miyazakii et al. | 475/275 |
| 2005/0113205 A1* | 5/2005 | Oguri et al. | 475/275 |
| 2005/0192150 A1* | 9/2005 | Shim | 475/275 |
| 2006/0052208 A1* | 3/2006 | Park | 475/275 |
| 2006/0052209 A1* | 3/2006 | Park | 475/275 |
| 2006/0052210 A1* | 3/2006 | Park | 475/275 |
| 2006/0052211 A1* | 3/2006 | Park | 475/275 |
| 2006/0052212 A1* | 3/2006 | Park | 475/275 |
| 2006/0052213 A1* | 3/2006 | Park | 475/275 |
| 2006/0063635 A1* | 3/2006 | Park | 475/275 |
| 2006/0100055 A1* | 5/2006 | Shim et al. | 475/275 |

* cited by examiner

*Primary Examiner*—Sherry Estremsky
(74) *Attorney, Agent, or Firm*—Morgan Lewis & Bockius LLP

(57) ABSTRACT

A six-speed powertrain of an automatic transmission is formed by combining three simple planetary gear sets, and an output element is realized as a single element without combination with a clutch. Therefore, because a torque load of a respective clutch is reduced, durability may be enhanced and a length of the transmission may be minimized.

40 Claims, 7 Drawing Sheets

| Operating element | | CLUTCH | | | BRAKE | | OWC | Gear ratio (exemplary) |
|---|---|---|---|---|---|---|---|---|
| | | C1 | C2 | C3 | B1 | B2 | | |
| D | 1st | ● | | | ○ | | ● | 4.044 |
| | 2nd | ● | | | | ● | | 2.371 |
| | 3rd | ● | ● | | | | | 1.556 |
| | 4th | ● | | ● | | | | 1.159 |
| | 5th | | ● | ● | | | | 0.852 |
| | 6th | | | ● | | ● | | 0.672 |
| R | | | ● | | ● | | | 3.193 |

SIX-SPEED POWERTRAIN OF AUTOMATIC TRANSMISSION

CROSS-REFERENCE TO RELATED APPLICATION

This application claims priority to and the benefit of Korean Patent Application No. 10-2004-0110553 filed in the Korean Intellectual Property Office on Dec. 22, 2004, the entire contents of which are incorporated herein by reference.

BACKGROUND OF THE INVENTION (a) Field of the Invention

The present invention relates to an automatic transmission, and more particularly, to a powertrain of an automatic transmission.

(b) Description of the Related Art

A multi-stage gearshift mechanism of an automatic transmission includes a plurality of planetary gear sets. A powertrain having such a plurality of planetary gear sets varies the torque in multi-stages and outputs it to an output shaft when receiving a converted engine torque from a torque converter.

The more speeds the powertrain of an automatic transmission has, the better the power performance and fuel consumption. Therefore, it is desirable for powertrains to have as many speeds as possible.

Even for the same number of speeds, durability, power transmission efficiency, and size/weight of a transmission are substantially dependent on how planetary gear sets are arranged. Therefore, research for more structural strength, less power loss, and more compact packaging are continuously being conducted.

Usually, development of a powertrain using planetary gear sets does not devise a wholly new type of planetary gear set. To the contrary, it invokes how single/double pinion planetary gear sets are combined, and how clutches, brakes, and one-way clutches are disposed to the combination of planetary gear sets such that required shift speeds and speed ratios are realized with minimal power loss.

For a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed. However, in some current transmissions, a first clutch variably connects a third ring gear with a second ring gear acting as the output element. Therefore, because the first clutch, connecting the output element, may be loaded with too much torque, a problem occurs in that durability is reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a six-speed powertrain having advantages of enhanced durability and shortened length.

An exemplary six-speed powertrain according to an embodiment of the present invention is formed by combining a first simple planetary gear set including a first sun gear, a first ring gear, and a first planet carrier as operational elements thereof, a second simple planetary gear set including a second sun gear, a second ring gear, and a second planet carrier as operational elements thereof, and a third simple planetary gear set including a third sun gear, a third ring gear, and a third planet carrier as operational elements thereof, wherein the first sun gear is fixedly connected to a transmission case so as to always act as a fixed element, one of the first planet carrier and the first ring gear is fixedly connected to an input shaft so as to always act as an input element, the second sun gear is fixedly connected to the one of the first planet carrier and the first ring gear which is not fixedly connected to the input shaft, the second planet carrier and the third planet carrier are fixedly connected to each other, the third ring gear is variably connected to the second ring gear through a first clutch, the third sun gear is fixedly connected to the one which is not fixedly connected to the input shaft of the first planet carrier and the first ring gear through a second clutch, the third ring gear is variably connected to the input shaft through a third clutch so as to act as a variable input element, and is variably connected to the transmission case through a first brake and a one-way clutch disposed in parallel with each other, the third sun gear is variably connected to the transmission case through a second brake, and the third planet carrier acts as an output element.

The first, the second, and the third simple planetary gear sets are disposed in a sequence of the first simple planetary gear set, the third simple planetary gear set, and the second simple planetary gear set from an engine side connected to the input shaft, the first and second simple planetary gear sets are formed as single pinion planetary gear sets, and the third simple planetary gear set is formed as a double pinion planetary gear set.

The first ring gear is fixedly connected to the input shaft, the second sun gear is fixedly connected to the first planet carrier, and the third sun gear is variably connected to the first planet carrier through a third clutch.

The first, the second, and the third simple planetary gear sets are disposed in a sequence of the first simple planetary gear set, the third simple planetary gear set, and the second simple planetary gear set from an engine side connected to the input shaft, the first and third simple planetary gear sets are formed as double pinion planetary gear sets, and the second simple planetary gear set is formed as a single pinion planetary gear set.

The second sun gear is fixedly connected to the first ring gear, and the third sun gear is variably connected to the first ring gear through a second clutch.

The second ring gear is variably connected to the input shaft through first and third clutches.

The first and third clutches are disposed outside in a shaft direction of the second simple planetary gear set, the second clutch is disposed between the first simple planetary gear set and the third simple planetary gear set, the first brake and the one-way clutch are disposed to one side of the transmission case outside of the second and third simple planetary gear sets, and the second brake is disposed to one side of the transmission case between the third simple planetary gear set and the first simple planetary gear set.

The first and third clutches are disposed outside in a shaft direction of the second simple planetary gear set, the second clutch is disposed outside in a shaft direction of the first simple planetary gear set, the first brake and the one-way clutch are disposed to one side of the transmission case outside of the second and third simple planetary gear sets, and the second brake is disposed to one side of the transmission case outside of the first simple planetary gear set.

The first clutch is disposed outside in a shaft direction of the second simple planetary gear set, the second and third clutches are disposed between the first simple planetary gear set and the third simple planetary gear set, the first brake and the one-way clutch are disposed to one side of the transmission case outside of the second and third simple planetary gear sets, and the second brake is disposed to one side of the transmission case between the third simple planetary gear set and the first simple planetary gear set.

The first clutch is disposed outside in a shaft direction of the second simple planetary gear set, the second clutch is disposed outside in a shaft direction of the first simple planetary gear set, the third clutch is disposed between the first simple planetary gear set and the third simple planetary gear set, the first brake and the one-way clutch are disposed to one side of the transmission case outside of the second and third simple planetary gear sets, and the second brake is disposed in the transmission case direction outside of the first simple planetary gear set.

An output gear is connected to the third planet carrier connecting a planetary gear of the third simple planetary gear set.

The first clutch and the one-way clutch are operated for a first forward speed, the second brake is operated for a second forward speed at a state of the first forward speed, the second clutch is operated and the second brake is released for a third forward speed at a state of the second forward speed, the second clutch is released and the third clutch is operated for a fourth forward speed at a state of the third forward speed, the first clutch is released and the second clutch is operated for a fifth forward speed at a state of the fourth forward speed, the second clutch is released and the second brake is operated for a sixth forward speed at a state of the fifth forward speed, and the second clutch and the first brake are operated for a reverse speed so as to realize six forward speeds and one reverse speed.

The first simple planetary gear set transmits a power of the input shaft to the second and third simple planetary gear sets through first and second input paths.

The first input path is a path that inputs the power of the input shaft, input to the first ring gear, after decreasing a speed of the input shaft at all speeds, to the second sun gear through the first planet carrier.

The second input path is a path that inputs the power of the input shaft input to the first ring gear, after decreasing a speed of the input power of the input shaft by an operation of the second clutch connecting the first planet carrier and the third sun gear at the third and fifth speeds and the reverse speed, to the third sun gear through the first planet carrier by decelerating.

The first simple planetary gear set transmits a power of the input shaft to the second and third simple planetary gear sets through first and second input paths.

The first input path is a path that inputs the power of the input shaft, input to the first planet carrier, after decreasing a speed of the input shaft at all speeds, to the second sun gear through the first ring gear.

The second input path is a path that inputs the power of the input shaft, input to the first planet carrier, after decreasing a speed of the input power of the input shaft by an operation of the second clutch connecting the first ring gear and the third sun gear at the third and fifth speeds and the reverse speed, to the third sun gear through the first ring gear.

A six-speed powertrain of an automatic transmission is formed by combining a first simple planetary gear set including a first sun gear, a first ring gear, and a first planet carrier as operational elements thereof, a second simple planetary gear set including a second sun gear, a second ring gear, and a second planet carrier as operational elements thereof, and a third simple planetary gear set including a third sun gear, a third ring gear, and a third planet carrier as operational elements thereof, wherein the first, the second, and the third simple planetary gear sets are disposed in a sequence of the first simple planetary gear set, the third simple planetary gear set, and the second simple planetary gear set from an engine side connected to the input shaft, the first and second simple planetary gear sets are formed as single pinion planetary gear sets, the third simple planetary gear set is formed as a double pinion planetary gear set, the first sun gear is fixedly connected to a transmission case so as to always act as a fixed element, the first ring gear is fixedly connected to an input shaft so as to always act as an input element, the second sun gear is fixedly connected to the first planet carrier, a second planetary gear is connected with a third planetary gear by a common planet carrier so as to rotate separately with the third planetary gear, the third sun gear is variably connected to the transmission case through a second brake, the third planet carrier acts as an output element, the third ring gear is variably connected to the second ring gear through a first clutch, the third sun gear of the double pinion planetary gear set with the second sun gear is variably connected to the first planet carrier of the first single pinion planetary gear set through a second clutch, and the third ring gear is variably connected to the input shaft through a third clutch so as to act as a variable input element and is variably connected to the transmission case through a first brake and a one-way clutch disposed in parallel with each other.

The second ring gear is variably connected to the input shaft through the first and third clutches.

The first and third clutches are disposed outside in a shaft direction of the second single pinion planetary gear set, the second clutch is disposed between the first single pinion planetary gear set and the double pinion planetary gear set, the first brake and the one-way clutch are disposed to one side of the transmission case outside of the second single pinion planetary gear set and the double pinion planetary gear set, and the second brake is disposed to one side of the transmission case between the double pinion planetary gear set and the first single pinion planetary gear set.

The first and third clutches are disposed outside in a shaft direction of the second single pinion planetary gear set, the second clutch is disposed outside in a shaft direction of the first single pinion planetary gear set, the first brake and the one-way clutch are disposed to one side of the transmission case outside of the second single pinion planetary gear set and the double pinion planetary gear set, and the second brake is disposed to one side of the transmission case outside of the first single pinion planetary gear set.

The first clutch is disposed outside in a shaft direction of the second single pinion planetary gear set, the second and third clutches are disposed between the first single pinion planetary gear set and the double pinion planetary gear set, the first brake and the one-way clutch are disposed to one side of the transmission case outside of the second single pinion planetary gear set and the double pinion planetary gear set, and the second brake is disposed to one side of the transmission case between the first single pinion planetary gear set and the double pinion planetary gear set.

The first clutch is disposed outside in a shaft direction of the second single pinion planetary gear set, the second clutch is disposed outside in a shaft direction of the first single pinion planetary gear set, the third clutch is disposed between the first single pinion planetary gear set and the double pinion planetary gear set, the first brake and the one-way clutch are disposed to one side of the transmission case outside of the second single pinion planetary gear set and the double pinion planetary gear set, and the second brake is disposed in the transmission case direction outside of the first single pinion planetary gear set.

An output gear is connected to the third planet carrier connecting a planetary gear of the double pinion planetary gear set.

The first clutch and the one-way clutch are operated for a first forward speed, the second brake is operated for a second forward speed at a state of the first forward speed, the second clutch is operated and the second brake is released for a third forward speed at a state of the second forward speed, the second clutch is released and the third clutch is operated for a fourth forward speed at a state of the third forward speed, the first clutch is released and the second clutch is operated for a fifth forward speed at a state of the fourth forward speed, the second clutch is released and the second brake is operated for a sixth forward speed at a state of the fifth forward speed, and the second clutch and the first brake are operated for a reverse speed.

The first single pinion planetary gear set transmits a power of the input shaft to the second single pinion planetary gear set and double pinion planetary gear set through first and second input paths.

The first input path is a path that inputs the power of the input shaft, input to the first ring gear, after decreasing a speed of the input shaft at all speeds, to the second sun gear through the first planet carrier.

The second input path is a path that inputs the power of the input shaft, input to the first ring gear, after decreasing a speed of the input power of the input shaft by an operation of the second clutch connecting the first planet carrier and the third sun gear at the third and fifth speeds and the reverse speed, to the third sun gear through the first planet carrier.

A six-speed powertrain of an automatic transmission is formed by combining a first simple planetary gear set including a first sun gear, a first ring gear, and a first planet carrier as operational elements thereof, a second simple planetary gear set including a second sun gear, a second ring gear, and a second planet carrier as operational elements thereof, and a third simple planetary gear set including a third sun gear, a third ring gear, and a third planet carrier as operational elements thereof, wherein the first, the second, and the third simple planetary gear sets are disposed in a sequence of the first simple planetary gear set, the third simple planetary gear set, and the second simple planetary gear set from an engine side connected to the input shaft, the first and third simple planetary gear sets are formed as first and second double pinion planetary gear sets, the second simple planetary gear set is formed as a single pinion planetary gear set, the first sun gear is fixedly connected to a transmission case so as to always act as a fixed element, the first planet carrier is fixedly connected to an input shaft so as to always act as an input element, the second sun gear is fixedly connected to the first ring gear, a second planetary gear of the single pinion planetary gear set is connected with a third planetary gear by a common planet carrier so as to rotate separately with the third planetary gear, the third sun gear is variably connected to the transmission case through a second brake, the third planet carrier acts as an output element, the third ring gear is variably connected to the second ring gear through a first clutch, is variably connected to the first ring gear through a second clutch with the second sun gear, is variably connected to the input shaft through a third clutch, acts as a variable input element, and is variably connected to the transmission case through a first brake and a one-way clutch disposed in parallel with each other.

The second ring gear is variably connected to the input shaft through the first and third clutches.

The first and third clutches are disposed outside in a shaft direction of the single pinion planetary gear set, the second clutch is disposed between the first double pinion planetary gear set and the second double pinion planetary gear set, the first brake and the one-way clutch are disposed to one side of the transmission case outside of the single pinion planetary gear set and the second double pinion planetary gear set, and the second brake is disposed to one side of the transmission case between the second double pinion planetary gear set and the first double pinion planetary gear set.

The first and third clutches are disposed outside in a shaft direction of the single pinion planetary gear set, the second clutch is disposed outside in a shaft direction of the first double pinion planetary gear set, the first brake and the one-way clutch are disposed to one side of the transmission case outside of the single pinion planetary gear set and the second double pinion planetary gear set, and the second brake is disposed to one side of the transmission case outside of the first double pinion planetary gear set.

The first clutch is disposed outside in a shaft direction of the single pinion planetary gear set, the second and third clutches are disposed between the first double pinion planetary gear set and the second double pinion planetary gear set, the first brake and the one-way clutch are disposed to one side of the transmission case outside of the single pinion planetary gear set and the second double pinion planetary gear set, and the second brake is disposed to one side of the transmission case between the first double pinion planetary gear set and the second double pinion planetary gear set.

The first clutch is disposed outside in a shaft direction of the single pinion planetary gear set, the second clutch is disposed outside in a shaft direction of the first double pinion planetary gear set, the third clutch is disposed between the first double pinion planetary gear set and the second double pinion planetary gear set, the first brake and the one-way clutch are disposed to one side of the transmission case outside of the single pinion planetary gear set and the second double pinion planetary gear set, and the second brake is disposed in the transmission case direction outside of the first double pinion planetary gear set.

An output gear is connected to the third planet carrier connecting a planetary gear of the second double pinion planetary gear set.

The first clutch and the one-way clutch are operated for a first forward speed, the second brake is operated for a second forward speed at a state of the first forward speed, the second clutch is operated and the second brake is released for a third forward speed at a state of the second forward speed, the second clutch is released and the third clutch is operated for a fourth forward speed at a state of the third forward speed, the first clutch is released and the second clutch is operated for a fifth forward speed at a state of the fourth forward speed, the second clutch is released and the second brake is operated for a sixth forward speed at a state of the fifth forward speed, and the second clutch and the first brake are operated for a reverse speed.

The first double pinion planetary gear set transmits a power of the input shaft to the single pinion planetary gear set and the second double pinion planetary gear set through first and second input paths.

The first input path is a path that inputs the power of the input shaft, input to the first planet carrier, after decreasing a speed of the input shaft at all speeds, to the second sun gear through the first ring gear.

The second input path is a path that inputs the power of the input shaft, input to the first planet carrier, after decreasing a speed of the input power of the input shaft, by an operation of the second clutch connecting the first ring gear and the third sun gear at the third and fifth speeds and the reverse speed, to the third sun gear through the first ring gear.

DETAILED DESCRIPTION OF THE EMBODIMENTS

An exemplary embodiment of the present invention will hereinafter be described in detail with reference to the accompanying drawings.

Figures 1, 2:
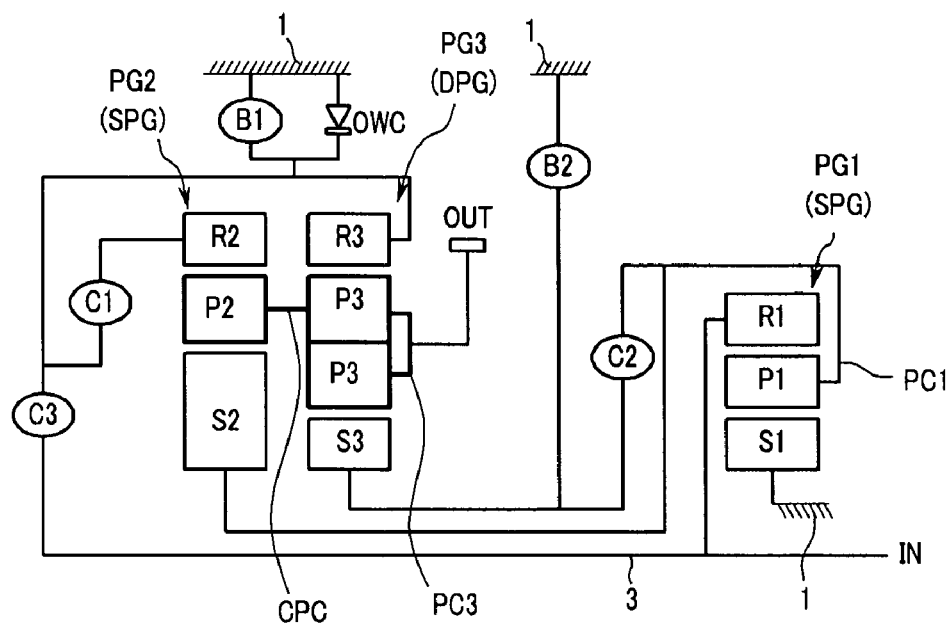
FIG. 1 shows a powertrain according to a first exemplary embodiment of the present invention.
FIG. 2 is an operational chart according to an exemplary embodiment of the present invention.

FIG. 1 shows a powertrain according to a first exemplary embodiment of the present invention.

According to the first exemplary embodiment of the present invention, a powertrain includes three clutches and two brakes, and six forward speeds and one reverse speed are realized by operational elements.

The powertrain includes a first single pinion planetary gear set PG1, a double pinion planetary gear set PG3, and a second single pinion planetary gear set PG2. The first single pinion planetary gear set PG1 includes a first sun gear Si, a first planetary gear P1, and a first ring gear R1 at the front of an input shaft 3 connected to an engine output side via a torque converter.

The double pinion planetary gear set PG3, at the rear of the first single pinion planetary gear set PG1, includes a third sun gear S3, two third planetary gears P3, and a third ring gear R3.

The second single pinion planetary gear set PG2, at the rear of the double pinion planetary gear set PG3, includes a second sun gear S2, a second planetary gear P2, and a second ring gear R2.

That is, an arrangement of the planetary gear sets is that the first single pinion planetary gear set PG1 is disposed in the front of the transmission and the second single pinion planetary gear set PG2 is disposed at the rear of the transmission.

In addition, the double pinion planetary gear set PG3 is disposed between the first single pinion planetary gear set PG1 and the second single pinion planetary gear set PG2.

The first single pinion planetary gear set PG1 includes the first sun gear S1, the first ring gear R1, the first planetary gear P1, and a first planet carrier PC1.

The first planet carrier PC1 supports the first planetary gear P1 to be rotatably engaged between the first sun gear S1 and the first ring gear R1.

The second single pinion planetary gear set PG2 includes the second planetary gear P2 engaged between the second ring gear R2 and the second sun gear S2, but does not include an additional planet carrier.

The double pinion planetary gear set PG3 includes the third sun gear S3, the third ring gear R3, and the two third planetary gears P3 engaged therebetween.

One of the two third planetary gears P3 is connected to the second planetary gear P2 by a common planet carrier CPC so as to be separately rotatable with each other.

In addition, the first sun gear S1 is fixedly connected to the transmission case 1 so as to always act as a fixed element.

The first ring gear R1 is connected to the input shaft 3 so as to always act as an input element.

The second sun gear S2 of the second single pinion planetary gear set PG2 is connected to the first planet carrier PC1.

In addition, the second planetary gear P2 is connected to one of the third planetary gears P3 by the common planet carrier CPC so as to be separately rotatable.

The third sun gear S3 is variably connected through a second clutch C2 to the first planet carrier PC1, along with the second sun gear S2.

In addition, the third sun gear S3 is variably connected to the transmission case 1 through a second brake B2.

The third planet carrier PC3 acts as an output element.

In addition, the third ring gear R3 is variably connected to the second ring gear R2 through a first clutch C1.

In addition, the third ring gear R3 is also variably connected to the input shaft 3 through a third clutch C3 so as to act as a variable input element.

The third ring gear R3 is variably connected to the transmission case 1 through a first brake B1 and a one-way clutch OWC disposed in parallel with each other.

The second ring gear R2 is variably connected to the input shaft 3 through the first and third clutches C1 and C3.

An output gear OUT is connected to the third planet carrier PC3 connecting the planetary gears of the double pinion planetary gear set PG3.

In addition, the first and third clutches C1 and C3 are disposed outside in a direction of the second single pinion planetary gear set PG2, and the second clutch C2 is disposed between the first single pinion planetary gear set PG1 and the double pinion planetary gear set PG3.

The first brake B1 and the one-way clutch OWC are disposed to one side of the transmission case 1 outside of the second single pinion planetary gear set PG2 and the double pinion planetary gear set PG3.

The second brake B2 may be disposed to one side of the transmission case 1 between the double pinion planetary gear set PG3 and the first single pinion planetary gear set PG1.

As described, according to the six-speed powertrain of the first exemplary embodiment of the present invention, power of the input shaft 3 is transmitted from the first single pinion planetary gear set PG1 to the second single pinion planetary gear set PG2 and the double pinion planetary gear set PG3 through respective first and second input paths.

That is, the first input path is a path that inputs the power of the input shaft 3, input to the first ring gear R1, after decreasing a speed of the input shaft 3 at all speeds, to the second sun gear S2 through the first planet carrier PC1.

The second input path is a path that inputs the power of the input shaft 3, input to the first ring gear R1, after decreasing a speed of the input power of the input shaft 3 by an operation of the second clutch C2 connecting the first planet carrier PC1 and the third sun gear S3 at the third and fifth speeds D3 and D5 and the reverse speed R, to the third sun gear S3 through the first planet carrier PC1.

FIG. 2 is an operational chart according to the first exemplary embodiment of the present invention.

According to the six-speed powertrain of the first exemplary embodiment of the present invention, as shown in FIG. 2, the one-way clutch OWC and the first clutch C1 are operated for the first forward speed, the second brake B2 is operated at a state of the first forward speed for the second forward speed, the second brake B2 is released and the second clutch C2 is operated at a state of the second forward speed for the third forward speed, and the second clutch C2 is released and the third clutch C3 is operated at a state of the third forward speed for the fourth forward speed.

In addition, the first clutch C1 is released and the second clutch C2 is operated at a state of the fourth forward speed for the fifth forward speed, the second clutch C2 is released and the second brake B2 is operated at a state of the fifth forward speed for the sixth forward speed, and the second clutch C2 and the first brake B1 are operated for the reverse speed.

Figure 3:
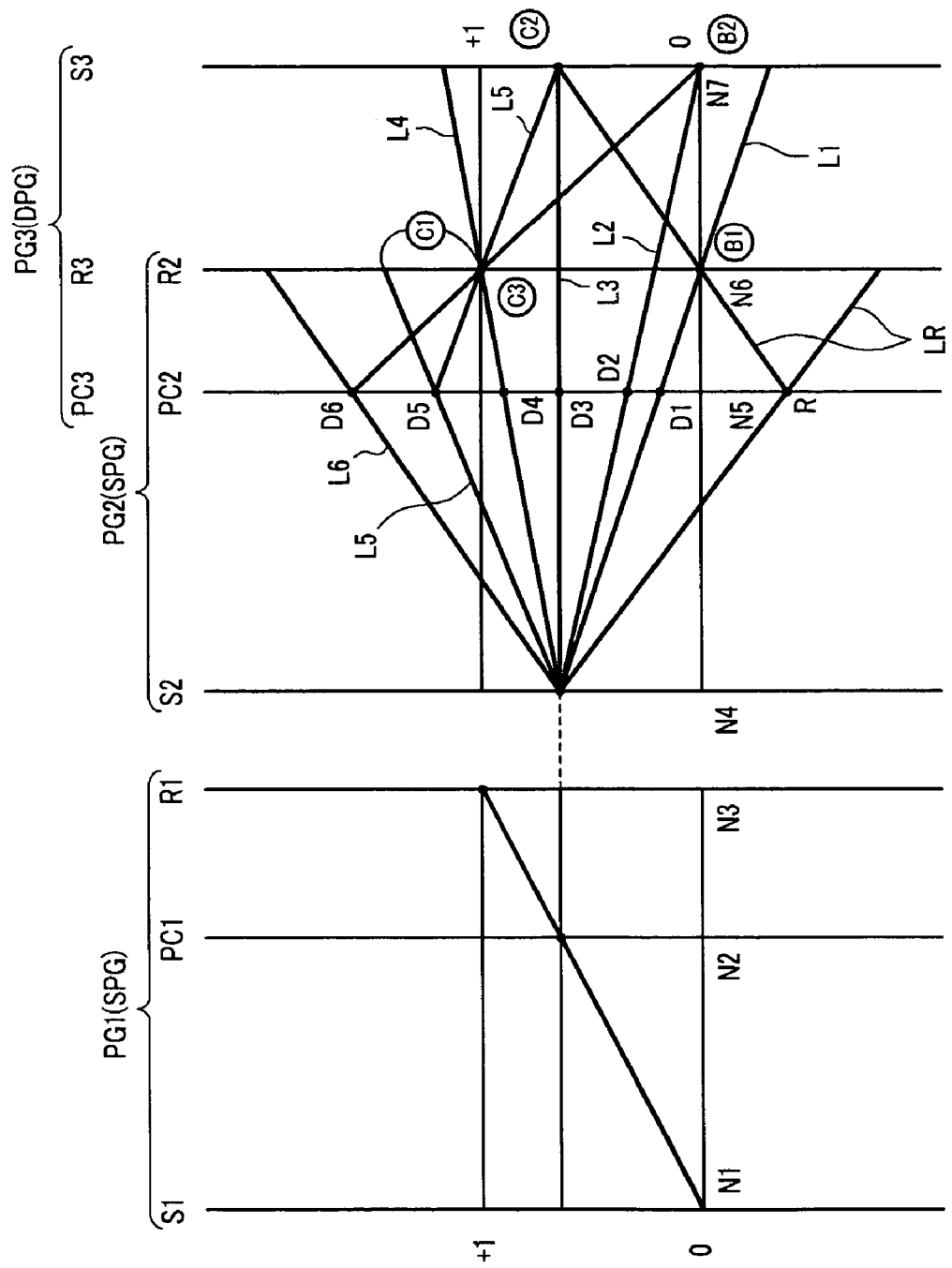
FIG. 3 is a shift diagram for first to sixth forward speeds and a reverse speed according to the first exemplary embodiment of the present invention.

Referring to FIG. 3, according to the first exemplary embodiment of the present invention, a process of forming the shift speeds of the six-speed powertrain is hereinafter described.

FIG. 3 is a shift diagram for first to sixth forward speeds and a reverse speed according to the first exemplary embodiment of the present invention.

As shown in FIG. 3, respective operational elements are disposed corresponding to respective nodes.

That is, the first node N1 (hereinafter called a first operational element) is formed by the first sun gear S1, the second node N2 is formed by the first planet carrier PC1, the third node N3 is formed by the first ring gear R1, the fourth node N4 is formed by the second sun gear S2, the fifth node N5 is formed by the second and third planet carriers PC2 and PC3, the sixth node N6 is formed by the second and third ring gears R2 and R3, and the seventh node N7 is formed by the third sun gear S3.

As described above, for the first forward speed, the first clutch C1 and the one-way clutch OWC are operated.

Therefore, in a state where the power is input through the third node N3 formed by the first ring gear R1, a decreased rotation speed input from the second node N2 is input to the fourth node N4 formed by the second sun gear S2.

At that time, the first forward speed line L1 is formed in FIG. 3 by a supplementary operation of the three simple planetary gear sets PG1, PG2, and PG3 with each other by which the sixth node N6 is operated as the fixed element.

Therefore, an output is realized as much as D1 through the fifth node N5 formed by the output element and a shift for the first forward speed is realized.

For the second forward speed, the second brake B2 is operated from the first forward speed.

Therefore, in a state where the power is input through the third node N3 formed by the first ring gear R1, a decreased rotation speed input from the second node N2 is input to the fourth node N4 formed by the second sun gear S2.

At that time, the first forward speed line L2 is formed in FIG. 3 by a supplementary operation of the three simple planetary gear sets PG1, PG2, and PG3 with each other by which the seventh node N7 is operated as the fixed element.

Therefore, an output is realized as much as D2 through the fifth node N5 formed by the output element and a shift for the second forward speed is realized.

For the third forward speed, the second brake B2 is released and the second clutch C2 is operated from the second forward speed.

Therefore, in a state where the power is input through the third node N3 formed by the first ring gear R1, a decreased rotation speed input from the second node N2 is input to the fourth node N4 formed by the second sun gear S2.

Simultaneously, a decreased rotation speed input from the second node N2 is input to the seventh node N7 formed by the third sun gear S3.

The third forward speed line L3 is formed in FIG. 3 by a supplementary operation of the three simple planetary gear sets PG1, PG2, and PG3 with each other.

Therefore, an output is realized as much as D3 through the fifth node N5 formed by the output element and a shift for the third forward speed is realized.

For the fourth forward speed, the second clutch C2 is released and the third clutch C3 is operated from the third forward speed.

Therefore, in a state where the power is input through the third node N3 formed by the first ring gear R1, a decreased rotation speed input from the second node N2 is input to the fourth node N4 formed by the second sun gear S2.

In addition, because the sixth node N6 formed by the second and third ring gears R2 and R3 is connected to the input shaft 3, an input speed is the same as the speed of the input shaft 3.

At that time, because a decreased rotation speed is input to the fourth node N4, the fourth node N4 is operated as the fixed element in fact.

The fourth forward speed line L3 is formed in FIG. 3 by a supplementary operation of the three simple planetary gear sets PG1, PG2, and PG3 with each other.

Therefore, an output is realized as much as D4 through the fifth node N5 formed by the output element and a shift for the fourth forward speed is realized.

For the fifth forward speed, the first clutch C1 is released and the second clutch C2 is operated from the fourth forward speed.

Therefore, in a state where the power is input through the third node N3 formed by the first ring gear R1, a decreased rotation speed input from the second node N2 is input to the fourth node N4 formed by the second sun gear S2.

In addition, since only the third ring gear R3 of the sixth node N6 is connected to the input shaft 3, an input speed which is the same as the speed of the input shaft 3 (i.e., at the same speed as the input engine speed) is realized.

At that time, because a decreased rotation speed is input to the fourth and seventh nodes N4 and N7, the fourth and seventh nodes N4 and N7 are operated as the fixed element in fact.

The fifth forward speed line L5 is formed in FIG. 3 by a supplementary operation of the three simple planetary gear sets PG1, PG2, and PG3 with each other.

Therefore, an output is realized as much as D5 through the fifth node N5 formed by the output element and a shift for the fifth forward speed is realized.

For the sixth forward speed, the second clutch C2 is released and the second brake B2 is operated from the fifth forward speed.

Therefore, in a state where the power is input through the third node N3 formed by the first ring gear R1, a decreased rotation speed input from the second node N2 is input to the fourth node N4 formed by the second sun gear S2.

In addition, since only the third ring gear R3 of the sixth node N6 is connected to the input shaft 3, an input speed which is the same as the speed of the input shaft 3 (i.e., at the same speed as the input engine speed) is realized.

At that time, because a decreased rotation speed is input to the fourth node N4, the fourth node N4 is operated as the fixed element in fact.

In addition, because the seventh node N7 is fixedly connected to the transmission case 1 through the second brake B2, the seventh node N7 is operated as a stopped fixed element.

The sixth forward speed line L6 is formed in FIG. 3 by a supplementary operation of the three simple planetary gear sets PG1, PG2, and PG3 with each other.

Therefore, an output is realized as much as D6 through the fifth node N5 formed by the output element and a shift for the sixth forward speed is realized.

In addition, for the reverse speed, the second clutch C2 and the first brake B1 are operated.

Therefore, in a state where the power is input through the third node N3 formed by the first ring gear R1, a decreased rotation speed input from the second node N2 is input to the fourth node N4 formed by the second sun gear S2.

In addition, the decreased rotation speed input from the second node N2 is input to the seventh node N7.

At that time, because the third ring gear R3 of the sixth node N6 is connected to the transmission case 1 through the first brake B1, the third ring gear R3 is operated as the fixed element.

The reverse speed line LR is formed in FIG. 3 by a supplementary operation of the three simple planetary gear sets PG1, PG2, and PG3 with each other.

Therefore, an output is realized as much as R through the fifth node N5 formed by the output element and a shift for the one reverse speed is realized.

Figure 4:
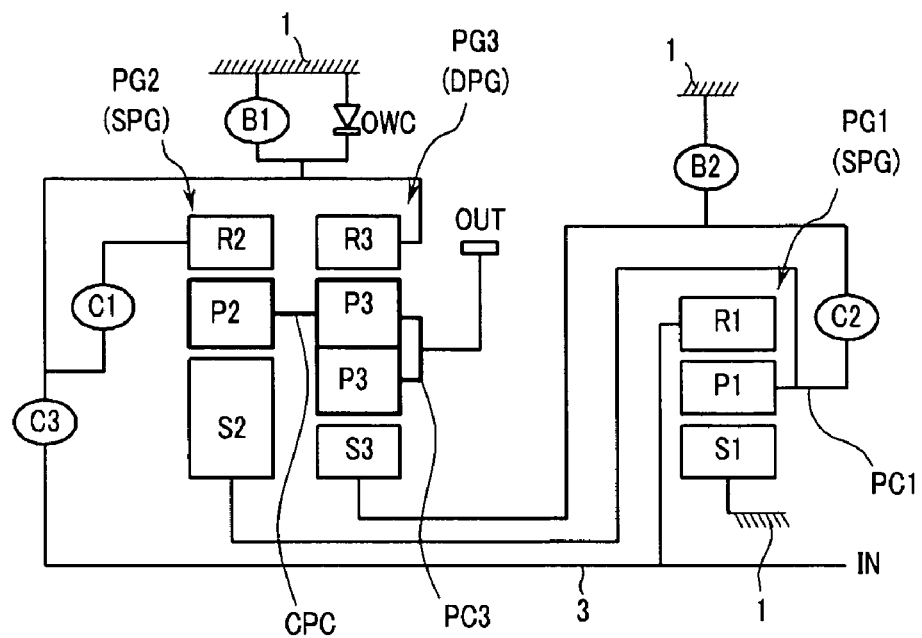
FIG. 4, FIG. 5, and FIG. 6 show powertrains according to second, third, and fourth exemplary embodiments of the present invention.

Referring to FIG. 4, a second exemplary embodiment of the present invention is described hereinafter.

FIG. 4 shows a powertrain according to the second exemplary embodiment of the present invention.

A powertrain according to the second exemplary embodiment of the present invention includes first and second single pinion planetary gear sets PG1 and PG2 and a double pinion planetary gear set PG3, the same as in the first exemplary embodiment of the present invention.

In addition, an arrangement of the powertrain, a connecting relation of respective operational elements, and combinations of connecting relations of respective frictional elements according to the second exemplary embodiment of the present invention are the same as in the first exemplary embodiment of the present invention.

In addition, paths along which the power is transmitted are the same as in the first exemplary embodiment and the same operational chart of the first exemplary embodiment is applied.

Further, the first and third clutches C1 and C3 are disposed outside in a shaft direction of the second single pinion planetary gear set PG2, however, according to the second exemplary embodiment of the present invention, the second clutch C2 is disposed outside in a shaft direction of the first single pinion planetary gear set PG1, different to the first embodiment.

In addition, the first brake B1 and the one-way clutch OWC are disposed to one side of the transmission case 1 outside of the second single pinion planetary gear set PG2 and the double pinion planetary gear set PG3.

The second brake B2 is disposed in a direction of the transmission case 1 outside of the first single pinion planetary gear set PG1.

That is, a position of the operational elements according to the second exemplary embodiment of the present invention is different from that of the first exemplary embodiment of the present invention.

However, because a shift process of the powertrain according to the second exemplary embodiment of the present invention is the same as shown in FIG. 3 for explaining the first exemplary embodiment, a detailed description is omitted herein.

Figure 5:
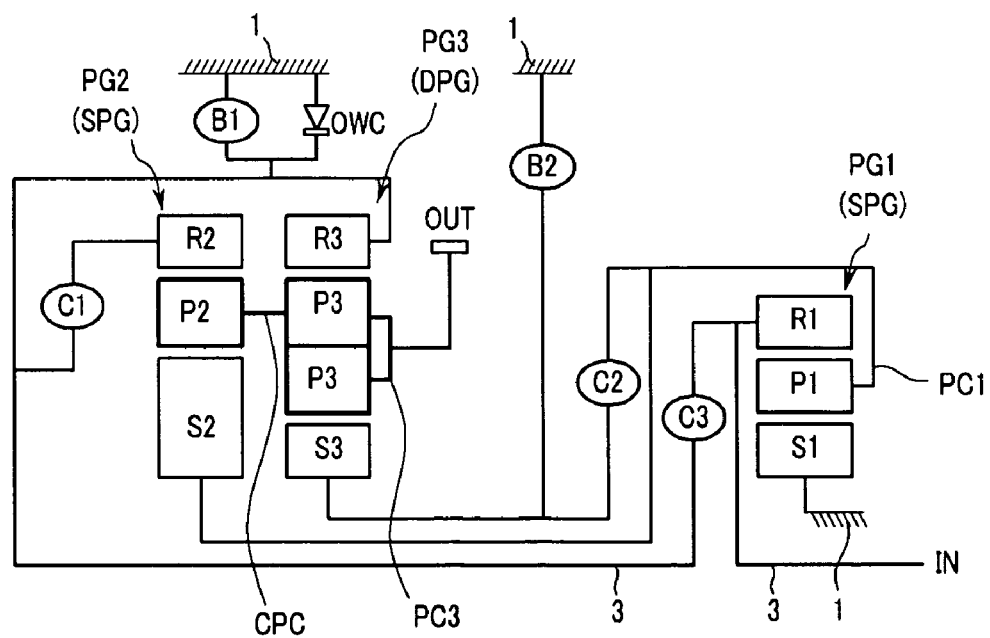

Referring to FIG. 5, a powertrain according to a third exemplary embodiment of the present invention is described hereinafter.

FIG. 5 shows a powertrain according to the third exemplary embodiment of the present invention.

An arrangement of the powertrain and a connecting relation of respective operational elements according to the third exemplary embodiment of the present invention are the same as in the first exemplary embodiment of the present invention.

In addition, paths along which the power is transmitted are the same as in the first exemplary embodiment and the same operational chart of the first exemplary embodiment is applied.

However, according to the powertrain of the third exemplary embodiment of the present invention, the first clutch C1 is disposed outside in a shaft direction of the second single pinion planetary gear set PG2 and the second and third clutches C2 and C3 are disposed between the first single pinion planetary gear set PG1 and the double pinion planetary gear set PG3.

The first brake B1 and the one-way clutch OWC are disposed to one side of the transmission case 1 outside of the second single pinion planetary gear set PG2 and the double pinion planetary gear set PG3.

The second brake B2 is disposed to one side of the transmission case 1 between the first single pinion planetary gear set PG1 and the double pinion planetary gear set PG3.

That is, a position of the operational elements according to the third exemplary embodiment of the present invention is different from that of the first exemplary embodiment of the present invention.

However, because a shift process of the powertrain according to the third exemplary embodiment of the present invention is the same as shown in FIG. 3 for explaining the first exemplary embodiment, a detailed description is omitted herein.

Figure 6:
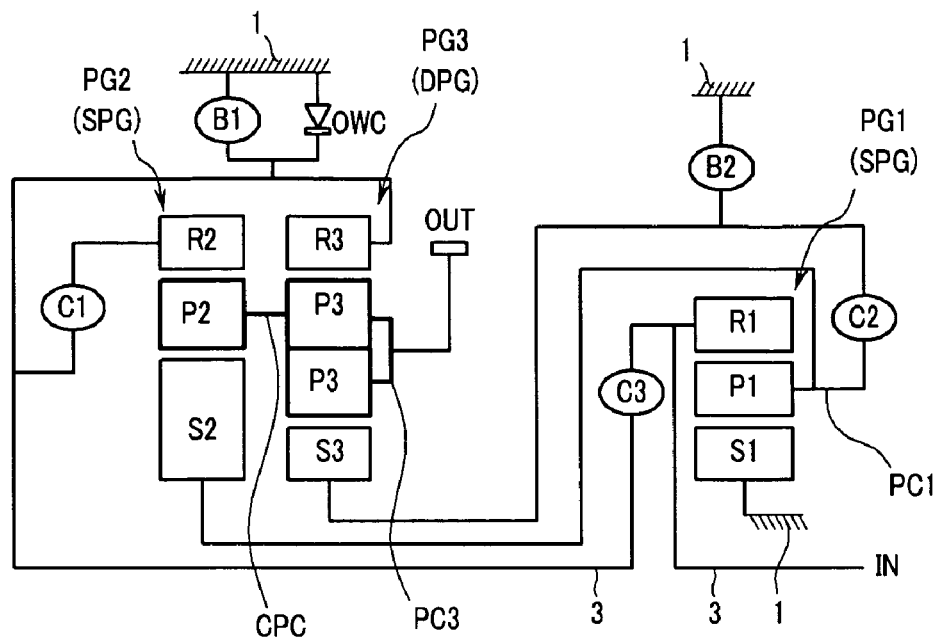

Referring to FIG. 6, a powertrain according to a fourth exemplary embodiment of the present invention is described hereinafter.

FIG. 6 shows a powertrain according to the fourth exemplary embodiment of the present invention.

An arrangement of the powertrain and a connecting relation of respective operational elements according to the fourth exemplary embodiment of the present invention are the same as the first exemplary embodiment of the present invention.

In addition, paths along which the power is transmitted are the same as in the first exemplary embodiment and the same operational chart of the first exemplary embodiment is applied.

However, according to the powertrain of the fourth exemplary embodiment of the present invention, the first clutch C1 is disposed outside in a shaft direction of the second single pinion planetary gear set PG2 and the second clutch C2 is disposed outside in a shaft direction of the first single pinion planetary gear set PG1.

The third clutch C3 is disposed between the first single pinion planetary gear set PG1 and the double pinion planetary gear set PG3.

The first brake B1 and the one-way clutch OWC are disposed to one side of the transmission case 1 outside of the second single pinion planetary gear set PG2 and the double pinion planetary gear set PG3.

The second brake B2 is disposed in the transmission case 1 direction outside of the first single pinion planetary gear set PG1.

That is, a position of the operational elements according to the fourth exemplary embodiment of the present invention is different from that of the first exemplary embodiment of the present invention.

However, because a shift process of the powertrain according to the fourth exemplary embodiment of the present invention is the same as shown in FIG. 3 for explaining the first exemplary embodiment, a detailed description is omitted herein.

Figure 7:
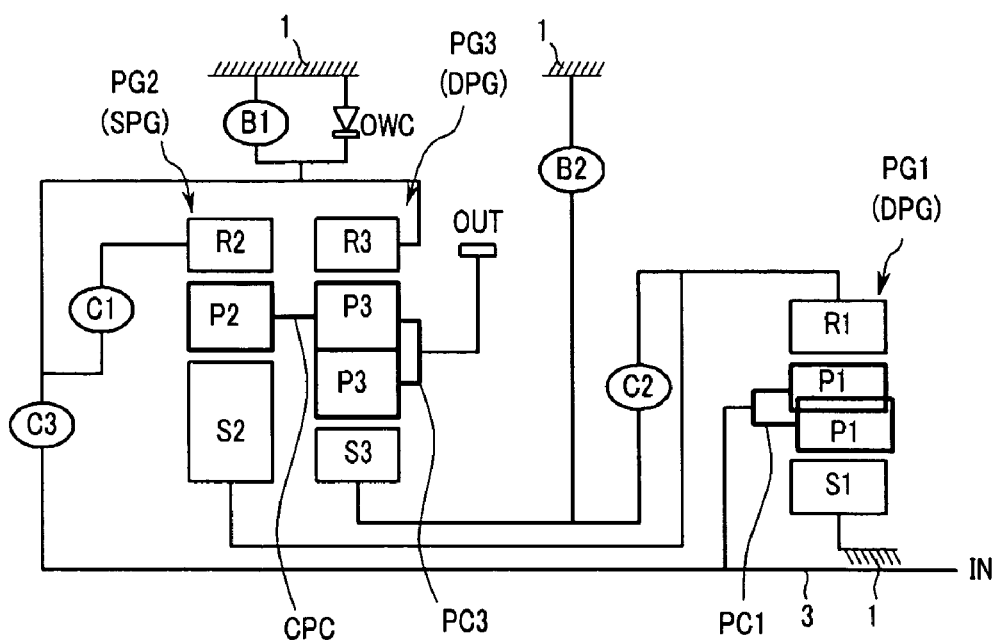
FIG. 7 shows a powertrain according to a fifth exemplary embodiment of the present invention.

Referring to FIG. 7, a powertrain according to a fifth exemplary embodiment of the present invention is described hereinafter.

FIG. 7 shows a powertrain according to the fifth exemplary embodiment of the present invention.

A powertrain according to the fifth exemplary embodiment of the present invention basically includes three simple planetary gear sets, like the powertrain according to the first exemplary embodiment of the present invention.

However, the powertrain according to the fifth exemplary embodiment of the present invention includes a first double pinion planetary gear set PG1 instead of the first single pinion planetary gear set.

Therefore, the fifth exemplary embodiment includes two double pinion planetary gear sets PG1 and PG3 and one single pinion planetary gear set PG2.

In addition, a difference between the first exemplary embodiment and the fifth exemplary embodiment of the present invention is that the first double pinion planetary gear set PG1 is applied instead of the first single pinion planetary gear set.

That is, the second sun gear S2 is fixedly connected to the first ring gear R1.

In addition, the third sun gear S3 is variably connected through the second clutch C2 to the first ring gear R1, along with the second sun gear S2.

In addition, an arrangement of the first and second double pinion planetary gear sets PG1 and PG3 and the single pinion planetary gear set PG2 and a combination of connecting relations of the operational elements are the same as that of the first embodiment of the present invention.

In addition, paths along which the power of the input shaft 3 is transmitted from the first double pinion planetary gear set PG1 to the single pinion planetary gear set PG2 and the second double pinion planetary gear set PG3 by utilizing the combination of the five operational elements includes a first input path and a second input path.

The first input path is a path that inputs the power of the input shaft 3, input to the first planet carrier PC1, after decreasing a speed of the input shaft at all speeds, to the second sun gear S2 through the first ring gear R1.

The second input path is the path that inputs the power of the input shaft 3, input to the first planet carrier PC1, after decreasing a speed of the input power of the input shaft 3 by an operation of the second clutch C2 at the third and fifth speeds and the reverse speed, to the third sun gear S3 through the first ring gear R1.

According to the powertrain of the fifth exemplary embodiment of the present invention, the arrangement of the five operational elements thereof is the same as in the first exemplary embodiment of the present invention.

That is, the first and third clutches C1 and C3 are disposed outside in a shaft direction of the single pinion planetary gear set PG2.

The second clutch C2 is disposed between the first double pinion planetary gear set PG1 and the second double pinion planetary gear set PG3.

The first brake B1 and the one-way clutch OWC are disposed to one side of the transmission case 1 outside of the single pinion planetary gear set PG2 and the second double pinion planetary gear set PG3.

The second brake B2 is disposed to one side of the transmission case 1 between the second double pinion planetary gear set PG3 and the first double pinion planetary gear set PG1.

In addition, an operational chart according to the fifth exemplary embodiment of the present invention is the same as that of the first exemplary embodiment.

Figure 8:
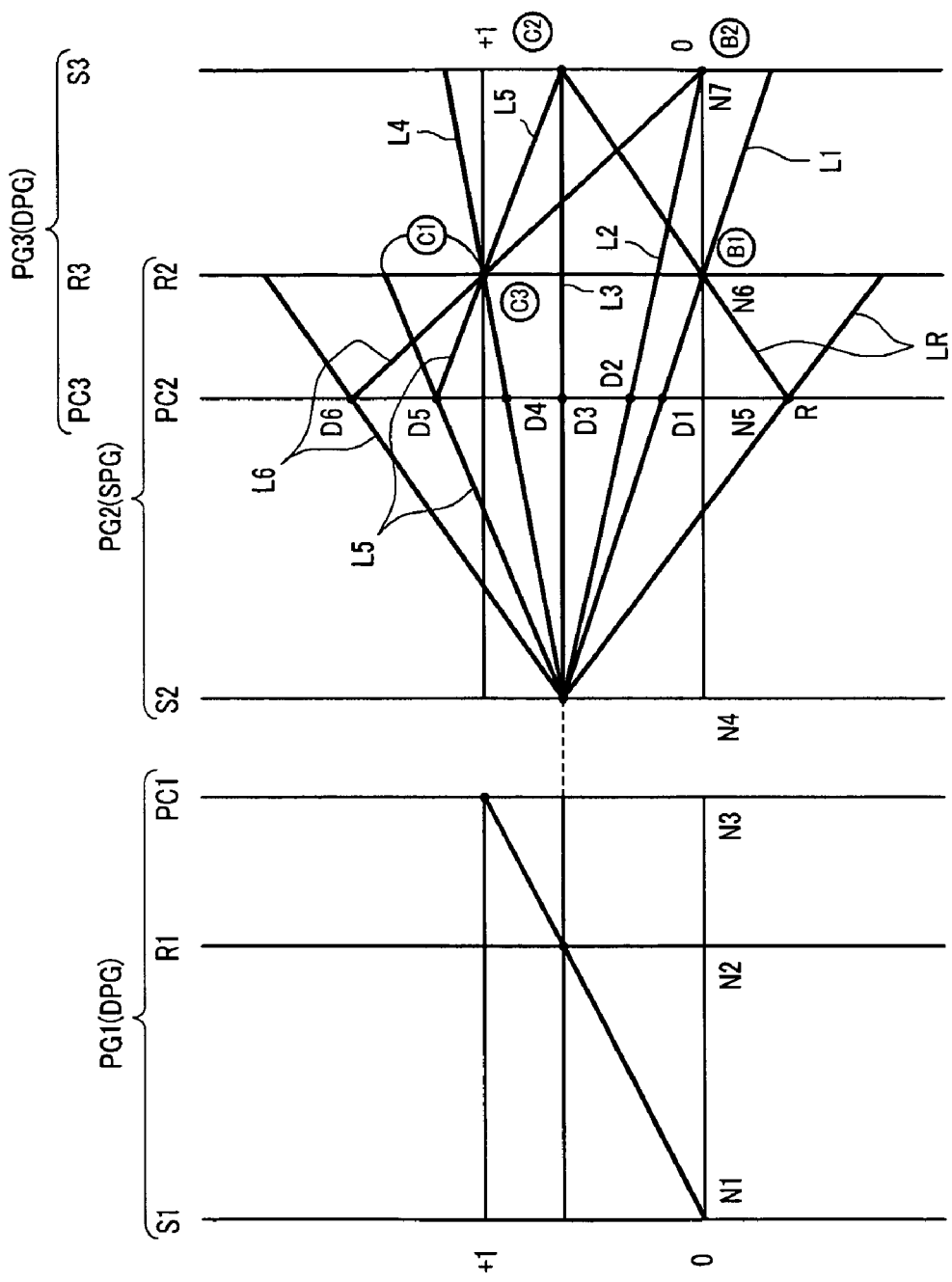
FIG. 8 is a shift diagram for first to sixth forward speeds and a reverse speed according to the fifth exemplary embodiment of the present invention.

FIG. 8 is a shift diagram for first to sixth forward speeds and a reverse speed according to the fifth exemplary embodiment of the present invention.

Therefore, a shift process of the powertrain according to the fifth exemplary embodiment of the present invention is shown in FIG. 8.

In addition, since a person of an ordinary skill in the art can realize a shift process of the fifth embodiment of the present invention through analyzing FIG. 3 in conjunction with the detailed description of the shift process of the first exemplary embodiment given above, a detailed description of such is omitted herein.

Figure 9:
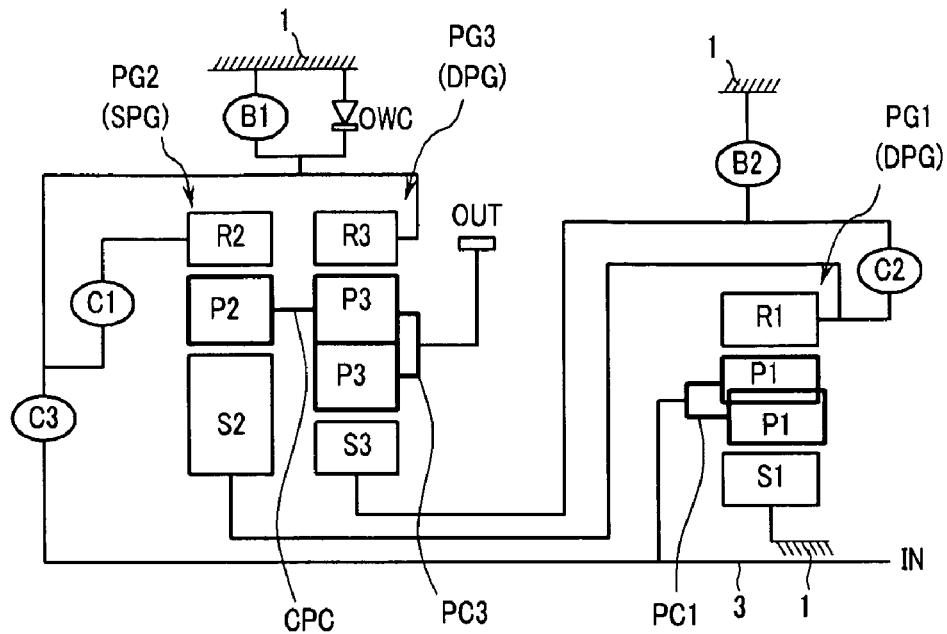
FIG. 9, FIG. 10, and FIG. 11 show powertrains according to sixth, seventh, and eighth exemplary embodiments of the present invention.
Figure 10:
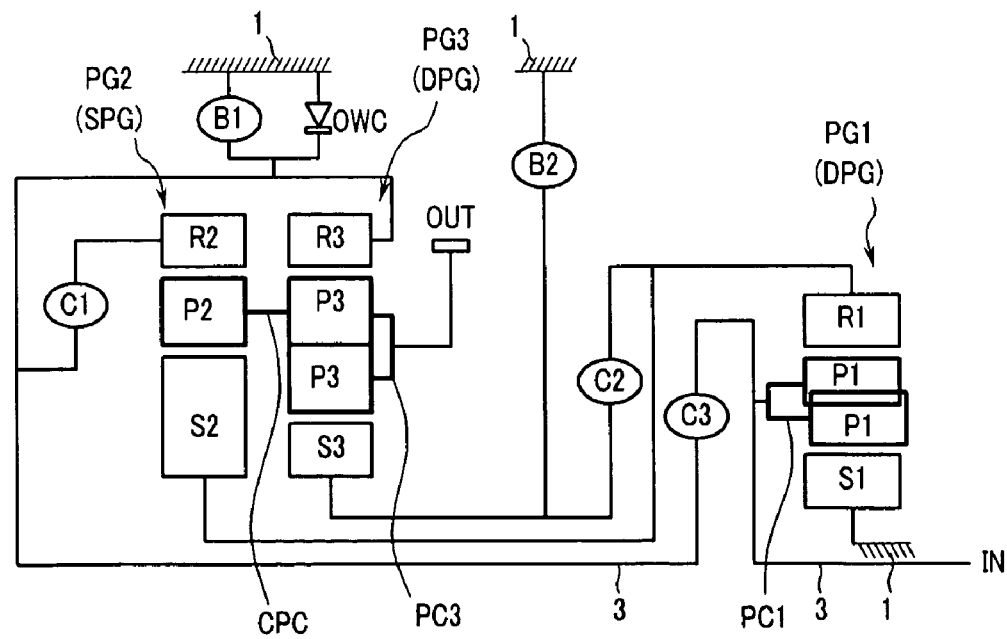
Figure 11:
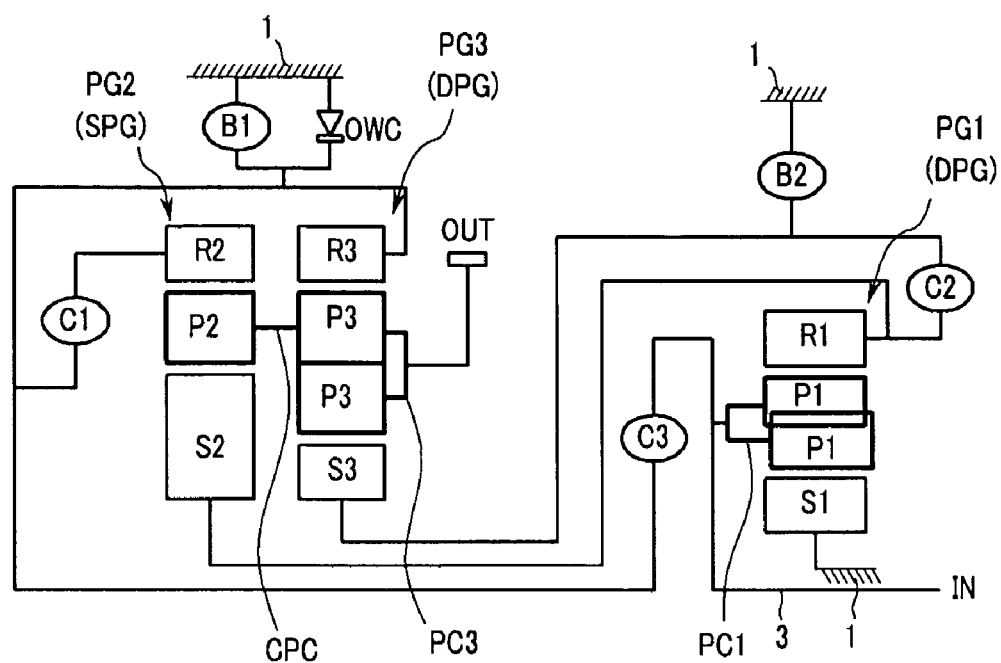

FIG. 9, FIG. 10, and FIG. 11 show powertrains according to sixth, seventh, and eighth exemplary embodiments of the present invention.

A powertrain according to the sixth exemplary embodiment of the present invention is basically the same as that of the first exemplary embodiment of the present invention in that the powertrain includes three simple planetary gear sets.

However, a first double pinion planetary gear set PG1 is applied instead of the first single pinion planetary gear set.

Therefore, according to the sixth exemplary embodiment of the present invention, two double pinion planetary gear sets PG1 and PG3 and one single pinion planetary gear set PG2 are applied.

In addition, the first double pinion planetary gear set PG1 is applied instead of the first single pinion planetary gear set.

That is, the second sun gear S2 is fixedly connected to the first ring gear R1, and the third sun gear S3 is variably connected, through the second clutch C2, to the first ring gear R1, along with the second sun gear S2.

An arrangement of the first and second double pinion planetary gear sets PG1 and PG3 and the single pinion planetary gear set PG2 and a connecting relation of respective operational elements are the same as that of the first embodiment of the present invention.

In addition, paths along which the power of the input shaft 3 is transmitted from the first double pinion planetary gear set PG1 to the single pinion planetary gear set PG2 and the second double pinion planetary gear set PG3 by utilizing the combination of the five operational elements includes a first input path and a second input path.

The first input path is a path that inputs the power of the input shaft 3, input to the first planet carrier PC1, after decreasing a speed of the input shaft at all speeds, to the second sun gear S2 through the first ring gear R1.

The second input path is a path that inputs the power of the input shaft 3, input to the first planet carrier PC1, after decreasing a speed of the input power of the input shaft 3 by an operation of the second clutch C2 at the third and fifth speeds and the reverse speed, to the third sun gear S3 through the first ring gear R1.

According to the sixth exemplary embodiment of the present invention, the first and third clutches C1 and C3 are disposed outside in a shaft direction of the single pinion planetary gear set PG2.

The second clutch C2 is disposed outside in a shaft direction of the first double pinion planetary gear set PG1, different from the first exemplary embodiment of the present invention.

The first brake B1 and the one-way clutch OWC are disposed to one side of the transmission case 1 outside of the single pinion planetary gear set PG2 and the second double pinion planetary gear set PG3.

The second brake B2 is disposed to one side of the transmission case 1 outside of the second double pinion planetary gear set PG3.

An operational chart of the sixth exemplary embodiment of the present invention is the same as that of the first exemplary embodiment.

Therefore, a shift process of the powertrain according to the sixth exemplary embodiment of the present invention is the same as for the fifth exemplary embodiment of the present invention as shown in FIG. 8.

In addition, since a person of an ordinary skill in the art can realize a shift process of the sixth embodiment of the present invention through analyzing FIG. 3 in conjunction with the detailed description of the shift process of the first exemplary embodiment given above, a detailed description of such is omitted herein.

A powertrain according to the seventh exemplary embodiment of the present invention includes a first double pinion planetary gear set PG1 instead of the first single pinion planetary gear set of the powertrain according to the first exemplary embodiment of the present invention.

Therefore, according to the seventh exemplary embodiment of the present invention, first and second double pinion planetary gear sets PG1 and PG3 and a single pinion planetary gear set PG2 are applied.

In addition, because the first double pinion planetary gear set PG1 is applied instead of the first single pinion planetary gear set, the second sun gear S2 is fixedly connected to the first ring gear R1.

The third sun gear S3 is variably connected to the first ring gear R1 through the second clutch C2.

In addition, an arrangement of the first and second double pinion planetary gear sets PG1 and PG3 and the single pinion planetary gear set PG2 is the same as that of the first exemplary embodiment of the present invention.

A combination of connecting relations of operational elements and a one-way clutch OWC is the same as that of the first exemplary embodiment of the present invention.

In addition, paths along which the power of the input shaft 3 is transmitted from the first double pinion planetary gear set PG1 to the single pinion planetary gear set PG2 and the second double pinion planetary gear set PG3 by utilizing the combination of the five operational elements includes a first input path and a second input path.

The first input path is a path that inputs the power of the input shaft 3, input to the first planet carrier PC1, after decreasing a speed of the input shaft at all speeds, to the second sun gear S2 through the first ring gear R1.

The second input path is a path that inputs the power of the input shaft 3, input to the first planet carrier PC1, after decreasing a speed of the input power of the input shaft 3 by an operation of the second clutch C2 at the third and fifth speeds and the reverse speed, to the third sun gear S3 through the first ring gear R1.

According to the seventh exemplary embodiment of the present invention, the first clutch C1 is disposed outside in a shaft direction of the single pinion planetary gear set PG2.

The second and third clutches C2 and C3 are disposed between the first simple planetary gear set PG1 and the third simple planetary gear set PG3, different from the first exemplary embodiment of the present invention.

The first brake B1 and the one-way clutch OWC are disposed to one side of the transmission case 1 outside of the single pinion planetary gear set PG2 and the second double pinion planetary gear set PG3.

The second brake B2 is disposed to one side of the transmission case 1 between the first and second double pinion planetary gear sets PG1 and PG3.

In addition, an operational chart of the seventh exemplary embodiment of the present invention is the same as that of the first exemplary embodiment.

Therefore, a shift process of the powertrain according to the seventh exemplary embodiment of the present invention is the same as that for the fifth exemplary embodiment of the present invention as shown in FIG. 8.

In addition, since a person of an ordinary skill in the art can realize a shift process of the seventh embodiment of the present invention through analyzing FIG. 3 in conjunction with the detailed description of the shift process of the first exemplary embodiment given above, a detailed description of such is omitted herein.

Referring to FIG. 11, a powertrain according to the eighth exemplary embodiment of the present invention includes a first double pinion planetary gear set PG1 instead of the first single pinion planetary gear set, different from that of the first exemplary embodiment of the present invention.

Therefore, according to the eighth exemplary embodiment of the present invention, first and second double pinion planetary gear sets PG1 and PG3 and a single pinion planetary gear set PG2 are applied.

In addition, because the first double pinion planetary gear set PG1 is applied instead of the first single pinion planetary gear set, the second sun gear S2 is fixedly connected to the first ring gear R1.

The third sun gear S3 is variably connected to the first ring gear R1 through the second clutch C2.

In addition, an arrangement of the first and second double pinion planetary gear sets PG1 and PG3 and the single pinion planetary gear set PG2 is the same as that of the first exemplary embodiment of the present invention.

A combination of connecting relations of operational elements and a one-way clutch OWC is the same as that of the first exemplary embodiment of the present invention.

In addition, paths along which the power of the input shaft 3 is transmitted from the first double pinion planetary gear set PG1 to the single pinion planetary gear set PG2 and the second double pinion planetary gear set PG3 by utilizing the combination of the five operational elements includes a first input path and a second input path.

The first input path is a path that inputs the power of the input shaft 3, input to the first planet carrier PC1, after decreasing a speed of the input shaft at all speeds, to the second sun gear S2 through the first ring gear R1.

The second input path is a path that inputs the power of the input shaft 3, input to the first planet carrier PC1, after decreasing a speed of the input power of the input shaft 3 by an operation of the second clutch C2 at the third and fifth speeds and the reverse speed, to the third sun gear S3 through the first ring gear R1.

According to the eighth exemplary embodiment of the present invention, the first clutch C1 is disposed outside in a shaft direction of the single pinion planetary gear set PG2.

The second clutch C2 is disposed outside in a shaft direction of the first double pinion planetary gear set PG1.

The third clutch C3 is disposed between the first double pinion planetary gear set PG1 and the second double pinion planetary gear set PG3.

The first brake B1 and the one-way clutch OWC are disposed to one side of the transmission case 1 outside of the single pinion planetary gear set PG2 and the second double pinion planetary gear set PG3.

The second brake B2 is disposed in the transmission case 1 direction outside of the first double pinion planetary gear set PG1.

That is, according to the eighth exemplary embodiment of the present invention, a relation of an arrangement of operational elements is different from the first exemplary embodiment of the present invention.

In addition, an operational chart of the eighth exemplary embodiment of the present invention is the same as that of the first exemplary embodiment Therefore, a shift process of the powertrain according to the eighth exemplary embodiment of the present invention is the same as that for the fifth exemplary embodiment of the present invention as shown in FIG. 8.

In addition, since a person of an ordinary skill in the art can realize a shift process of the eighth embodiment of the present invention through analyzing FIG. 3 in conjunction with the detailed description of the shift process of the first exemplary embodiment given above, a detailed description of such is omitted herein.

As described, according to an exemplary embodiment of the present invention, specifically, a skip shift from the sixth forward speed to the fourth forward speed, from the fifth forward speed to the third forward speed, and from the fourth forward speed to the second forward speed are realized by a change of one operational element.

Therefore, according to an exemplary embodiment of the present invention, a degree of freedom of the skip shift is obtained and a shift feel can be enhanced.

As described, a powertrain according to exemplary embodiments of the present invention is formed by a combination of three simple planetary gear sets.

In addition, because the output element is formed to an operational element without a connecting relation with a clutch, a torque load of the respective clutch for variable connection can be reduced.

Therefore, durability of the corresponding clutch can be enhanced.

In addition, because an arrangement of the five operational elements is optimized, a length of the transmission can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission formed by combining a first simple planetary gear set including a first sun gear, a first ring gear, and a first planet carrier as operational elements thereof, a second simple planetary gear set including a second sun gear, a second ring gear, and a second planet carrier as operational elements thereof, and a third simple planetary gear set including a third sun gear, a third ring gear, and a third planet carrier as operational elements thereof, wherein
   the first sun gear is fixedly connected to a transmission case so as to always act as a fixed element,
   one of the first planet carrier and the first ring gear is fixedly connected to an input shaft so as to always act as an input element,
   the second sun gear is fixedly connected to the one of the first planet carrier and the first ring gear which is not fixedly connected to the input shaft,
   the second planet carrier and the third planet carrier are fixedly connected to each other,
   the third ring gear is variably connected to the second ring gear through a first clutch,
   the third sun gear is variably connected to the one which is not fixedly connected to the input shaft of the first planet carrier and the first ring gear through a second clutch,
   the third ring gear is variably connected to the input shaft through a third clutch so as to act as a variable input element, and is variably connected to the transmission case through a first brake and a one-way clutch disposed in parallel with each other,
   the third sun gear is variably connected to the transmission case through a second brake, and
   the third planet carrier acts as an output element.

2. The six-speed powertrain of claim 1,
   wherein the first, the second, and the third simple planetary gear sets are disposed in a sequence of the first simple planetary gear set, the third simple planetary gear set, and the second simple planetary gear set from an engine side connected to the input shaft,
   the first and second simple planetary gear sets are formed as single pinion planetary gear sets, and
   the third simple planetary gear set is formed as a double pinion planetary gear set.

3. The six-speed powertrain of claim 2,
   wherein the first ring gear is fixedly connected to the input shaft,
   the second sun gear is fixedly connected to the first planet carrier, and
   the third sun gear is variably connected to the first planet carrier through the second clutch.

4. The six-speed powertrain of claim 2,
wherein the first simple planetary gear set transmits a power of the input shaft to the second and third simple planetary gear sets through first and second input paths.

5. The six-speed powertrain of claim 4,
wherein the first input path is
a path that inputs the power of the input shaft input to the first ring gear, after decreasing a speed of the input shaft at all speeds, to the second sun gear through the first planet carrier.

6. The six-speed powertrain of claim 4,
wherein the second input path is a path that inputs the power of the input shaft input to the first ring gear, after decreasing a speed of the input power of the input shaft by an operation of the second clutch connecting the first planet carrier and the third sun gear at the third and fifth speeds and the reverse speed, to the third sun gear through the first planet carrier by decelerating.

7. The six-speed powertrain of claim 1,
wherein the first, the second, and the third simple planetary gear sets are disposed in a sequence of the first simple planetary gear set, the third simple planetary gear set, and the second simple planetary gear set from an engine side connected to the input shaft,
the first and third simple planetary gear sets are formed as double pinion planetary gear sets, and
the second simple planetary gear set is formed as a single pinion planetary gear set.

8. The six-speed powertrain of claim 7,
wherein the second sun gear is fixedly connected to the first ring gear, and the third sun gear is variably connected to the first ring gear through the second clutch.

9. The six-speed powertrain of claim 7,
wherein the first simple planetary gear set transmits a power of the input shaft to the second and third simple planetary gear sets through first and second input paths.

10. The six-speed powertrain of claim 9,
wherein the first input path is
a path that inputs the power of the input shaft input to the first planet carrier, after decreasing a speed of the input shaft at all speeds, to the second sun gear through the first ring gear.

11. The six-speed powertrain of claim 9,
wherein the second input path is
a path that inputs the power of the input shaft input to the first planet carrier, after decreasing a speed of the input power of the input shaft by an operation of the second clutch connecting the first ring gear and the third sun gear at the third and fifth speeds and the reverse speed, to the third sun gear through the first ring gear.

12. The six-speed powertrain of claim 1, wherein the second ring gear is variably connected to the input shaft through the first and third clutches.

13. The six-speed powertrain of claim 1,
wherein the first and third clutches are disposed outside in a shaft direction of the second simple planetary gear set,
the second clutch is disposed between the first simple planetary gear set and the third simple planetary gear set,
the first brake and the one-way clutch are disposed to one side of the transmission case outside of the second and third simple planetary gear sets, and
the second brake is disposed to one side of the transmission case between the third simple planetary gear set and the first simple planetary gear set.

14. The six-speed powertrain of claim 1,
wherein the first and third clutches are disposed outside in a shaft direction of the second simple planetary gear set,
the second clutch is disposed outside in a shaft direction of the first simple planetary gear set,
the first brake and the one-way clutch are disposed to one side of the transmission case outside of the second and third simple planetary gear sets, and
the second brake is disposed to one side of the transmission case outside of the first simple planetary gear set.

15. The six-speed powertrain of claim 1,
wherein the first clutch is disposed outside in a shaft direction of the second simple planetary gear set,
the second and third clutches are disposed between the first simple planetary gear set and the third simple planetary gear set,
the first brake and the one-way clutch are disposed to one side of the transmission case outside of the second and third simple planetary gear sets, and
the second brake is disposed to one side of the transmission case between the third simple planetary gear set and the first simple planetary gear set.

16. The six-speed powertrain of claim 1,
wherein the first clutch is disposed outside in a shaft direction of the second simple planetary gear set,
the second clutch is disposed outside in a shaft direction of the first simple planetary gear set,
the third clutch is disposed between the first simple planetary gear set and the third simple planetary gear set,
the first brake and the one-way clutch are disposed to one side of the transmission case outside of the second and third simple planetary gear sets, and
the second brake is disposed in the transmission case direction outside of the first simple planetary gear set.

17. The six-speed powertrain of claim 1, wherein an output gear is connected to the third planet carrier connecting a planetary gear of the third simple planetary gear set.

18. The six-speed powertrain of claim 1,
wherein the first clutch and the one-way clutch are operated for a first forward speed,
the second brake is operated for a second forward speed at a state of the first forward speed,
the second clutch is operated and the second brake is released for a third forward speed at a state of the second forward speed,
the second clutch is released and the third clutch is operated for a fourth forward speed at a state of the third forward speed,
the first clutch is released and the second clutch is operated for a fifth forward speed at a state of the fourth forward speed,
the second clutch is released and the second brake is operated for a sixth forward speed at a state of the fifth forward speed, and
the second clutch and the first brake are operated for a reverse speed so as to realize six forward speeds and one reverse speed.

19. A six-speed powertrain of an automatic transmission formed by combining a first simple planetary gear set including a first sun gear, a first ring gear, and a first planet carrier as operational elements thereof, a second simple planetary gear set including a second sun gear, a second ring gear, and a second planet carrier as operational elements thereof, and a third simple planetary gear set including a third sun gear, a third ring gear, and a third planet carrier as operational elements thereof,
- wherein the first, the second, and the third simple planetary gear sets are disposed in a sequence of the first simple planetary gear set, the third simple planetary gear set, and the second simple planetary gear set from an engine side connected to the input shaft,
- the first and second simple planetary gear sets are formed as single pinion planetary gear sets,
- the third simple planetary gear set is formed as a double pinion planetary gear set,
- the first sun gear is fixedly connected to a transmission case so as to always act as a fixed element,
- the first ring gear is fixedly connected to an input shaft so as to always act as an input element,
- the second sun gear is fixedly connected to the first planet carrier,
- a second planetary gear is connected with a third planetary gear by a common planet carrier so as to rotate separately with the third planetary gear,
- the third sun gear is variably connected to the transmission case through a second brake,
- the third planet carrier acts as an output element, the third ring gear is variably connected to the second ring gear through a first clutch,
- the third sun gear of the double pinion planetary gear set is variably connected to the first planet carrier of the first single pinion planetary gear set through a second clutch, and
- the third ring gear is variably connected to the input shaft through a third clutch so as to act as a variable input element and is variably connected to the transmission case through a first brake and a one-way clutch disposed in parallel with each other.

20. The six-speed powertrain of claim 19,
wherein the second ring gear is,
variably connected to the input shaft through the first and third clutches.

21. The six-speed powertrain of claim 19,
wherein the first and third clutches are disposed outside in a shaft direction of the second single pinion planetary gear set,
the second clutch is disposed between the first single pinion planetary gear set and the double pinion planetary gear set,
the first brake and the one-way clutch are disposed to one side of the transmission case outside of the second single pinion planetary gear set and the double pinion planetary gear set, and
the second brake is disposed to one side of the transmission case between the double pinion planetary gear set and the first single pinion planetary gear set.

22. The six-speed powertrain of claim 19,
wherein the first and third clutches are disposed outside in a shaft direction of the second single pinion planetary gear set,
the second clutch is disposed outside in a shaft direction of the first single pinion planetary gear set,
the first brake and the one-way clutch are disposed to one side of the transmission case outside of the second single pinion planetary gear set and the double pinion planetary gear set, and
the second brake is disposed to one side of the transmission case outside of the first single pinion planetary gear set.

23. The six-speed powertrain of claim 19,
wherein the first clutch is disposed outside in a shaft direction of the second single pinion planetary gear set,
the second and third clutches are disposed between the first single pinion planetary gear set and the double pinion planetary gear set,
the first brake and the one-way clutch are disposed to one side of the transmission case outside of the second single pinion planetary gear set and the double pinion planetary gear set, and
the second brake is disposed to one side of the transmission case between the first single pinion planetary gear set and the double pinion planetary gear set.

24. The six-speed powertrain of claim 19,
wherein the first clutch is disposed outside in a shaft direction of the second single pinion planetary gear set,
the second clutch is disposed outside in a shaft direction of the first single pinion planetary gear set,
the third clutch is disposed between the first single pinion planetary gear set and the double pinion planetary gear set,
the first brake and the one-way clutch are disposed to one side of the transmission case outside of the second single pinion planetary gear set and the double pinion planetary gear set, and
the second brake is disposed in the transmission case direction outside of the first single pinion planetary gear set.

25. The six-speed powertrain of claim 19,
wherein an output gear is connected to the third planet carrier connecting a planetary gear of the double pinion planetary gear set.

26. The six-speed powertrain of claim 19,
wherein the first clutch and the one-way clutch are operated for a first forward speed,
the second brake is operated for a second forward speed at a state of the first forward speed,
the second clutch is operated and the second brake is released for a third forward speed at a state of the second forward speed,
the second clutch is released and the third clutch is operated for a fourth forward speed at a state of the third forward speed,
the first clutch is released and the second clutch is operated for a fifth forward speed at a state of the fourth forward speed,
the second clutch is released and the second brake is operated for a sixth forward speed at a state of the fifth forward speed, and
the second clutch and the first brake are operated for a reverse speed.

27. The six-speed powertrain of claim 19,
wherein the first single pinion planetary gear set transmits a power of the input shaft to the second single pinion planetary gear set and the double pinion planetary gear set through first and second input paths.

28. The six-speed powertrain of claim 27,
wherein the first input path is,
a path that inputs the power of the input shaft, input to the first ring gear, after decreasing a speed of the input shaft at all speeds, to the second sun gear through the first planet carrier.

29. The six-speed powertrain of claim 27,
wherein the second input path
is a path that inputs the power of the input shaft, input to the first ring gear, after decreasing a speed of the input power of the input shaft by an operation of the second clutch connecting the first planet carrier and the third sun gear at the third and fifth speeds and the reverse speed, to the third sun gear through the first planet carrier.

30. A six-speed powertrain of an automatic transmission formed by combining a first simple planetary gear set including a first sun gear, a first ring gear, and a first planet carrier as operational elements thereof, a second simple planetary gear set including a second sun gear, a second ring gear, and a second planet carrier as operational elements thereof, and a third simple planetary gear set including a third sun gear, a third ring gear, and a third planet carrier as operational elements thereof, wherein the first, the second, and the third simple planetary gear sets are disposed in a sequence of the first simple planetary gear set, the third simple planetary gear set, and the second simple planetary gear set from an engine side connected to the input shaft, the first and third simple planetary gear sets are formed as first and second double pinion planetary gear sets, the second simple planetary gear set is formed as a single pinion planetary gear set, the first sun gear is fixedly connected to a transmission case so as to always act as a fixed element, the first planet carrier is fixedly connected to an input shaft so as to always act as an input element, the second sun gear is fixedly connected to the first ring gear, a second planetary gear of the single pinion planetary gear set is connected with a third planetary gear by a common planet carrier so as to rotate separately with the third planetary gear, the third sun gear is variably connected to the transmission case through a second brake and is variably connected to the first ring gear through a second clutch, the third planet carrier acts as an output element, the third ring gear is variably connected to the second ring gear through a first clutch, is variably connected to the input shaft through a third clutch, so as to act as a variable input element, and is variably connected to the transmission case through a first brake and a one-way clutch disposed in parallel with each other.

31. The six-speed powertrain of claim 30,
wherein the second ring gear is,
variably connected to the input shaft through the first and third clutches.

32. The six-speed powertrain of claim 30,
wherein the first and third clutches are disposed outside in a shaft direction of the single pinion planetary gear set,
the second clutch is disposed between the first double pinion planetary gear set and the second double pinion planetary gear set,
the first brake and the one-way clutch are disposed to one side of the transmission case outside of the single pinion planetary gear set and the second double pinion planetary gear set, and
the second brake is disposed to one side of the transmission case between the second double pinion planetary gear set and the first double pinion planetary gear set.

33. The six-speed powertrain of claim 30,
wherein the first and third clutches are disposed outside in a shaft direction of the single pinion planetary gear set,
the second clutch is disposed outside in a shaft direction of the first double pinion planetary gear set, the first brake and the one-way clutch are disposed to one side of the transmission case outside of the single pinion planetary gear set and the second double pinion planetary gear set, and
the second brake is disposed to one side of the transmission case outside of the first double pinion planetary gear set.

34. The six-speed powertrain of claim 30,
wherein the first clutch is disposed outside in a shaft direction of the single pinion planetary gear set,
the second and third clutches are disposed between the first double pinion planetary gear set and the second double pinion planetary gear set,
the first brake and the one-way clutch are disposed to one side of the transmission case outside of the single pinion planetary gear set and the second double pinion planetary gear set, and
the second brake is disposed to one side of the transmission case between the first double pinion planetary gear set and the second double pinion planetary gear set.

35. The six-speed powertrain of claim 30,
wherein the first clutch is disposed outside in a shaft direction of the single pinion planetary gear set,
the second clutch is disposed outside in a shaft direction of the first double pinion planetary gear set,
the third clutch is disposed between the first double pinion planetary gear set and the second double pinion planetary gear set,
the first brake and the one-way clutch are disposed to one side of the transmission case outside of the single pinion planetary gear set and the second double pinion planetary gear set, and
the second brake is disposed in the transmission case direction outside of the first double pinion planetary gear set.

36. The six-speed powertrain of claim 30,
wherein an output gear is connected to the third planet carrier connecting a planetary gear of the second double pinion planetary gear set.

37. The six-speed powertrain of claim 30,
wherein the first clutch and the one-way clutch are operated for a first forward speed,
the second brake is operated for a second forward speed at a state of the first forward speed,
the second clutch is operated and the second brake is released for a third forward speed at a state of the second forward speed,
the second clutch is released and the third clutch is operated for a fourth forward speed at a state of the third forward speed,
the first clutch is released and the second clutch is operated for a fifth forward speed at a state of the fourth forward speed,
the second clutch is released and the second brake is operated for a sixth forward speed at a state of the fifth forward speed, and
the second clutch and the first brake are operated for a reverse speed.

38. The six-speed powertrain of claim 30,
wherein the first double pinion planetary gear set transmits a power of the input shaft to the single pinion planetary gear set and the second double pinion planetary gear set through first and second input paths.

39. The six-speed powertrain of claim 38,
wherein the first input path is,
a path that inputs the power of the input shaft, input to the first planet carrier, after decreasing a speed of the input shaft at all speeds, to the second sun gear through the first ring gear.

40. The six-speed powertrain of claim 38,
wherein the second input path is a path that inputs the power of the input shaft, input to the first planet carrier, after decreasing a speed of the input power of the input shaft by an operation of the second clutch connecting the first ring gear and the third sun gear at the third and fifth speeds and the reverse speed, to the third sun gear through the first ring gear.

* * * * *